United States Patent
Bever et al.

(10) Patent No.: US 12,124,996 B2
(45) Date of Patent: Oct. 22, 2024

(54) NODE-BASED CONTROL AND COLLABORATION SYSTEMS

(71) Applicant: Disney Enterprises, Inc., Burbank, CA (US)

(72) Inventors: Rebecca Bever, Burbank, CA (US); Julianne Hope Groves, Altadena, CA (US); Jo Lockman, Los Angeles, CA (US); Mara Idai Lucien, Los Angeles, CA (US); Erika Varis Doggett, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 133 days.

(21) Appl. No.: 17/570,278

(22) Filed: Jan. 6, 2022

(65) Prior Publication Data
US 2022/0215326 A1     Jul. 7, 2022

Related U.S. Application Data

(60) Provisional application No. 63/134,880, filed on Jan. 7, 2021.

(51) Int. Cl.
*G06Q 10/00*     (2023.01)
*G06F 21/62*     (2013.01)
(Continued)

(52) U.S. Cl.
CPC ....... *G06Q 10/101* (2013.01); *G06F 21/6218* (2013.01); *G06Q 10/063114* (2013.01); *G06F 2221/2141* (2013.01)

(58) Field of Classification Search
CPC ......... G06Q 10/101; G06Q 10/063114; G06Q 10/06395; G06Q 10/00; G06Q 10/02;
(Continued)

(56) References Cited

U.S. PATENT DOCUMENTS 8,600,793 B2 * 12/2013 Wang ..................... G06Q 10/10
                                                                             705/7.11
8,738,414 B1 * 5/2014 Nagar .................. G06Q 10/103
                                                                             705/7.12
(Continued)

OTHER PUBLICATIONS

Brindescu, Caius, Planning for Untangling: Predicting the Difficulty of Merge Conflicts, May 2020, ProceedingsoftheACM/IEEE42 InternationalConferenceonSoftwareEngineeringMay202011pp. 1-11. (Year: 2020).*
(Continued)

*Primary Examiner* — Joseph M Waesco
(74) *Attorney, Agent, or Firm* — Farjami & Farjami LLP (57) ABSTRACT

A system includes processing hardware, and a memory storing software code including a hierarchical user interface (UI). The processing hardware executes the software code to receive from a first user, via the hierarchical UI, project data describing a project, and a project task for completion by a second user, and to generate, using the project data, a node-based graph of the project including the project task. The processing hardware further executes the software code to receive, via the hierarchical UI in response to performance of at least a portion of the project task by the second user, a task progression or task completion data, update, using the task progression or task completion data, the node-based graph, and display to the first user, via the hierarchical UI, the updated node-based graph and the task progression data or task completion data.

18 Claims, 9 Drawing Sheets

(51) Int. Cl.
*G06Q 10/0631* (2023.01)
*G06Q 10/101* (2023.01)

(58) Field of Classification Search
CPC ........ G06Q 10/06; G06Q 10/10; G06Q 30/02; G06F 21/6218; G06F 2221/2141; G05B 2219/31357
See application file for complete search history.

(56) References Cited

U.S. PATENT DOCUMENTS

| | | | |
|---|---|---|---|
| 11,109,099 B1 | 8/2021 | Doggett et al. | |
| 2003/0069869 A1 | 4/2003 | Gronau | |
| 2003/0101089 A1 | 5/2003 | Chappel et al. | |
| 2005/0044307 A1 | 2/2005 | Regev | |
| 2005/0114829 A1 | 5/2005 | Robin et al. | |
| 2005/0229151 A1 | 10/2005 | Gupta et al. | |
| 2007/0129976 A1 | 6/2007 | Hochberg et al. | |
| 2007/0171224 A1* | 7/2007 | MacPherson | G06F 3/0481 345/440 |
| 2008/0313110 A1* | 12/2008 | Kreamer | G06Q 10/1097 706/14 |
| 2008/0313596 A1* | 12/2008 | Kreamer | G06Q 10/06315 717/101 |
| 2009/0138415 A1* | 5/2009 | Lancaster | G06N 5/04 706/11 |
| 2009/0144098 A1* | 6/2009 | Korat | G06Q 10/06 705/7.15 |
| 2009/0144365 A1* | 6/2009 | Korat | G06Q 10/10 709/204 |
| 2011/0022437 A1 | 1/2011 | Mundy et al. | |
| 2011/0078426 A1* | 3/2011 | Stoitsev | G06Q 10/04 718/107 |
| 2011/0107231 A1* | 5/2011 | Gueldemeister | G06Q 10/10 715/745 |
| 2012/0016713 A1 | 1/2012 | Wilcock et al. | |
| 2013/0024235 A1 | 1/2013 | Willems et al. | |
| 2014/0012616 A1* | 1/2014 | Moshenek | G06Q 10/063114 705/7.15 |
| 2015/0006232 A1 | 1/2015 | Anaby-Tavor et al. | |
| 2015/0066556 A1* | 3/2015 | Dominick | G06Q 50/18 705/7.15 |
| 2015/0254597 A1 | 9/2015 | Jahagirdar | |
| 2016/0004759 A1* | 1/2016 | Ramakrishnan | G06F 16/282 715/753 |
| 2016/0162819 A1* | 6/2016 | Hakman | G06Q 10/0633 705/7.27 |
| 2016/0182544 A1* | 6/2016 | Adjaoute | G06Q 30/0185 705/7.15 |
| 2017/0236081 A1* | 8/2017 | Grady Smith | G06Q 10/0637 705/7.36 |
| 2018/0114178 A1 | 4/2018 | Asokan | |
| 2018/0181446 A1* | 6/2018 | Bequet | G06F 9/5066 |
| 2019/0130330 A1 | 5/2019 | Slagle et al. | |
| 2019/0155870 A1 | 5/2019 | Prakash et al. | |
| 2019/0251486 A1* | 8/2019 | Gottemukkala | G06Q 10/06311 |
| 2020/0210931 A1 | 7/2020 | Idan et al. | |

OTHER PUBLICATIONS

Caius Brindescu, Iftekhar Ahmed, Rafael Leano, Anita Sarma "Planning for Untangling: Predicting the Difficulty of Merge Conflicts" Proceedings of the ACM/IEEE 42$^{nd}$ International Conference on Software Engineering May 2020 11 Pgs.

U.S. Appl. No. 17/202,189 "Techniques for Personalizing the Playback of a Media Title Based on User Interactions with an Internet of Things Device" filed Mar. 15, 2021 pp. 1-63.

"Action Recognition: Papers with code." https://paperswithcode.com/task/action-recognition-in-videos pp. 1-11.

Rohit Ghosh. "Deep Learning for Videos: A 2018 Guide to Action Recognition", Qure.ai Blog, Revolutionizing Healthcare with deep learning. Jun. 11, 2018 pp. 1-20.

Kamal Ali and Steven p. Ketchpel. "Golden Path Analyzer: Using Divide- and-Conquer to Cluster Web Clickstreams". Jan. 2003 pp. 1-10.

Wengong Jin, Regina Barzilay, and Tommi Jaakkola. "Hierarchical Generation of Molecular Graphs using Structural Motifs", ICML Feb. 8, 2020. pp. 1-14.

"Provision Infrastructure as Code". AWS CloudFormation, Amazon Web Services https://aws.amazon.com/cloudformation pp. 1-6.

"ShotGrid. Get Prices & Buy ShotGrid: Formerly Shotgun Software". https://www.autodesk.com/products/shotgrid/overview pp. 1-8.

"ShotGrid RV: A Digital Review Tool for Film, TV, and Games". https://www.shotgridsoftware.com/rv/ pp. 1-7.

"Storage: Ways to provide both long-term and temporary storage to Pods in your cluster". https://kubernetes.io/docs/concepts/storage/_print/ pp. 1-53.

Kanigalpula Samanvi and Naveen Sivadasan. "Subgraph Similarity Search in Large Graphs". 2015 pp. 1-10.

"USD Basics: Introduces a number of USD concepts, and how they relate to Houdini's USD support". https://www.sidefx.com/docs/houdini/solaris/usd.html pp. 1-17.

"USD Home: Universal Scene Description" https://graphics.pixar.com/usd/release/index.html pp. 1-2.

File History of U.S. Appl. No. 17/570,289, filed Jan. 6, 2022, titled Proactive Conflict Resolution in Node-Based Collaboration Systems.

\* cited by examiner

NODE-BASED CONTROL AND COLLABORATION SYSTEMS

RELATED APPLICATIONS

The present application claims the benefit of and priority to a Provisional Patent Application Ser. No. 63/134,880 filed on Jan. 7, 2021, and titled "Node-Based Control and Collaboration System," which is hereby incorporated fully by reference into the present application.

BACKGROUND

Large or complex projects increasingly require the collaboration of experts from a variety of fields who may be independent contractors, or experts affiliated with businesses or other entities independent of the initiator of the project. This need for collaboration between project initiators or "clients" and the third-parties with which they contract for collaborative services or "vendors" has led to the design of workflows to manage and synchronize the distribution and modification of data relevant to the collaborative project. The intricacies of these existing collaborative processes synchronize different versions of data and associated notes back and forth among vendors and clients. Consequently, existing collaboration solutions typically result in both clients and their vendors being in possession of copies of substantially the same data. That duplication and proliferation of data is undesirable because it increases the cost and time required to ensure data consistency and security. Thus, there is a need in the art for a centralized solution to assist in streamlining collaboration between clients and their vendors so as to reduce data redundancy and ensure data consistency and security.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application discloses systems and methods for performing node-based control and collaboration. The novel and inventive concepts disclosed herein advantageously render a substantially seamless collaboration solution that increases efficiency by reducing or eliminating duplication of data while ensuring that executive control over a creative asset or other proprietary data is retained by the appropriate entities. It is noted that although the present control and collaboration solution is described below in detail by reference to its use in a media based environment, such as a television (TV) or feature film production environment, the present novel and inventive principles may more generally be utilized to ensure data control and enhance collaboration efficiency for substantially any data processing application.

With respect to the specific and merely exemplary use case described herein, it is noted that the need for collaboration between project initiators (e.g., production studios) (hereinafter "clients") and the third-parties with which they contract for creative services (hereinafter "vendors") has led to the design of workflows to manage and synchronize the distribution and modification of creative assets. These existing collaborative processes typically synchronize versioned media and associated notes back and forth among vendors and clients. Consequently, and as noted above, existing collaboration solutions tend to result in both clients and their vendors being in possession of copies of substantially the same data. As further noted above, such duplication and proliferation of data is undesirable because it increases the cost and time required to ensure data consistency and security.

The present application discloses a centralized node-based solution to assist in streamlining collaboration between clients and their vendors in an exemplary media-based environment. The present node-based control and collaboration solution advantageously enables clients to make assignments to their vendors through one unified system, and to be informed when a new version of a creative asset has been delivered, as well as what metadata associated with that creative asset has changed, while providing an environment that enables concurrent collaboration by multiple users (e.g., clients, editors, and vendors). In addition, the present node-based control and collaboration solution advantageously enables vendors to keep track of assignments and notes from clients, flag changes to creative assets or their metadata, confirm to clients that their requests have been addressed, and analyze changes to a version of a creative asset before that version is sent back to the client for review and approval. Examples of changes to a version of a creative asset may include tuning color, addition of motion blur, timecode adjustments, shot retiming, exposure adjustment, edge work, and keying, to name merely a few.

Regarding the term "shot," as defined for the purposes of the present application, a "shot" refers to a continuous series of video frames that are captured from a unique camera perspective without cuts and other cinematic transitions. Moreover, as used herein, the term "sequence" refers to a segment of video including multiple shots in a particular order. In various implementations, a sequence of video may correspond to a portion of a scene composed of multiple shots, or to one or more of such scenes. It is also noted that the acronyms EDL and USD referred to in the present disclosure or identified in the accompanying Figures have their customary meaning in the art. Thus "EDL" denotes Edit Decision List, while "USD" denotes Universal Screen Descriptor, as those features are well known in the art.

Figure 1:
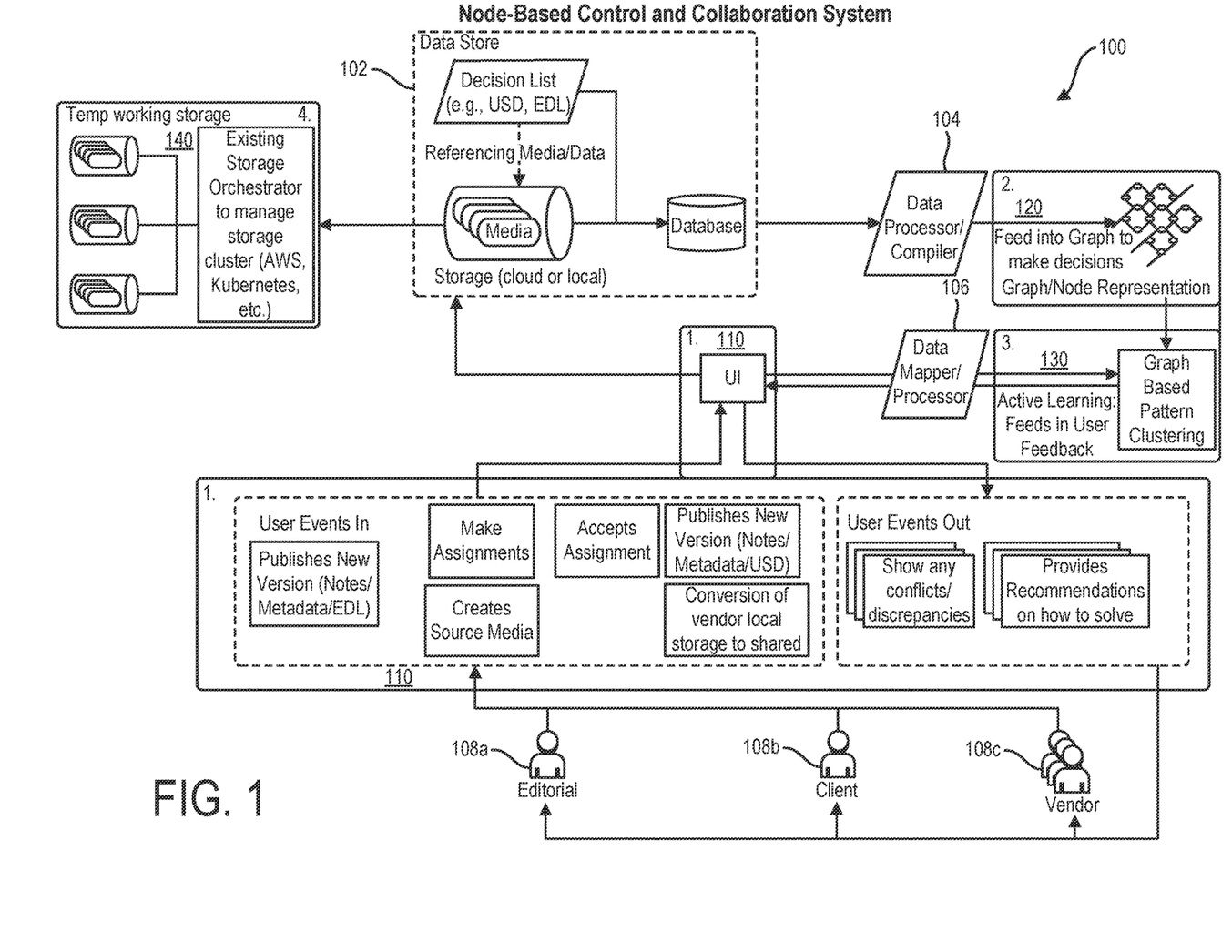
FIG. 1 shows a diagram of a node-based control and collaboration system, according to one implementation.

Referring to FIG. 1, FIG. 1 shows an overview of node-based control and collaboration system 100. As shown in FIG. 1, node-based control and collaboration system 100 includes hierarchical user interface 110 (hereinafter "hierarchical UI 110"), node-based distribution and collaboration subsystem 120 executing a collaboration software code, automated conflict resolution and recommendation subsystem 130, and automated memory space 140 providing temporary storage of creative assets during collaboration, as well as data processor/compiler 104, and data mapper/processor 106 configured to provide data for displaying decisions, conflicts, and dependencies. As further shown in FIG. 1, node-based control and collaboration system 100 is implemented in a use environment including long-term data storage 102. Also shown in FIG. 1 are various users of node-based control and collaboration system 100 (hereinafter "users 108a-108c"), including exemplary editor 108a, exemplary client 108b, and exemplary vendor 108c. Although the exemplary use case depicted in FIG. 1 includes three users 108a-108c, in other use cases node-based control and collaboration system 100 may be utilized by two users. e.g., users 108b and 108c, or more than three users.

It is noted that the components of node-based control and collaboration system 100, i.e., hierarchical UI 110, node-based distribution and collaboration subsystem 120, automated conflict resolution and recommendation subsystem 130, automated memory space 140 providing temporary storage of creative assets during collaboration, data processor/compiler 104, and data mapper/processor 106 can be implemented in a cloud-based environment, an on-premises environment, or a hybrid environment including both cloud-based and on-premises resources. It is further noted that the creative assets subject to collaboration among editor 108a, client 108b, and vendor 108c may be sourced from any of the previously identified environments, i.e., cloud-based, on-premises, or hybrid.

It is also noted that automated memory space 140 may take the form of any computer-readable non-transitory storage medium. The expression "computer-readable non-transitory storage medium," as used in the present application, refers to any medium, excluding a carrier wave or other transitory signal that provides instructions to processing hardware of node-based control and collaboration system 100, such as data processor/compiler 104 and data mapper/processor 106. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

The processing hardware included in data processor/compiler 104 and data mapper/processor 106 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as the collaboration software code executed by node-based distribution and collaboration subsystem 120, the system memory of node-based control and collaboration system 100, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

It is noted that, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes multiple hidden layers between input and output layers, which may allow for learning based on features not explicitly defined in raw data. In various implementations. NNs may be trained as classifiers and may be utilized to perform image processing, audio processing, or natural-language processing.

In some implementations, node-based control and collaboration system 100 may include one or more web servers, accessible over a packet-switched network such as the Internet, for example. Alternatively, node-based control and collaboration system 100 may include one or more computer servers supporting a private wide area network (WAN), local area network (LAN), or included in another type of limited distribution or private network. In addition, or alternatively, in some implementations, node-based control and collaboration system 100 may utilize a local area broadcast method, such as User Datagram Protocol (UDP) or Bluetooth, for example, or a high-speed network suitable for high performance computing (HPC), for instance, such as a 10 GigE network or an Infiniband network. Furthermore, in some implementations, node-based control and collaboration system 100 may be implemented virtually, such as in a data center. For example, in some implementations, node-based control and collaboration system 100 may be implemented in software, or as virtual machines.

Figure 2A:
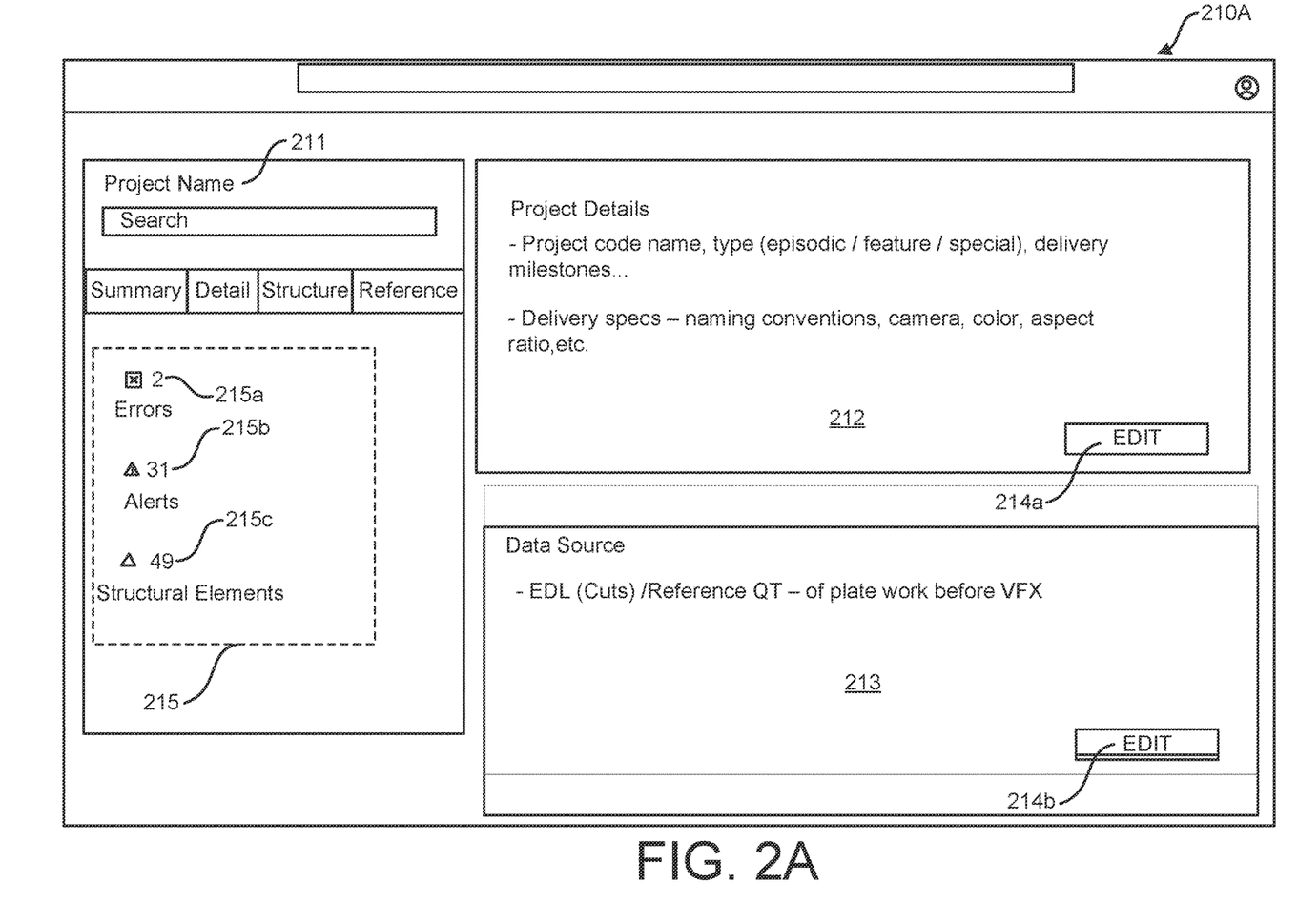
FIG. 2A shows an exemplary dashboard provided by a hierarchical user interface (UI) of the node-based control and collaboration system shown in FIG. 1, according to one implementation.
Figure 2B:
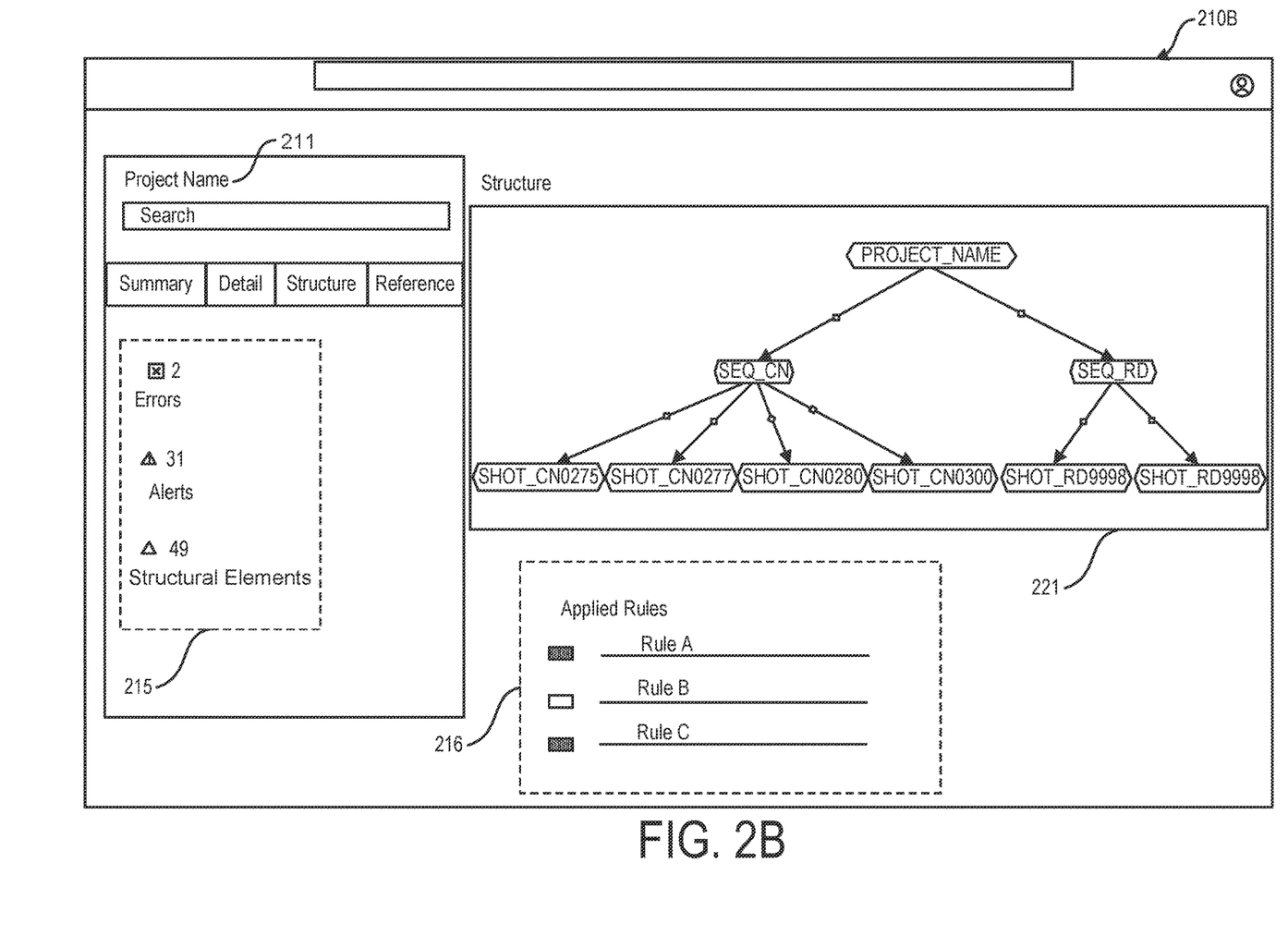
FIG. 2B shows another exemplary dashboard provided by the hierarchical UI of the node-based control and collaboration system shown in FIG. 1, according to one implementation.

A. Hierarchical UI 110:

FIGS. 2A, 2B. 2C, and 2D show various dashboards provided by hierarchical UI 110, in FIG. 1, according to one exemplary implementation. FIG. 2A shows project creation dashboard 210A where project details can be specified. For example, the dashboard shown in FIG. 2A can be used to identify project name 211 and features 215 associated with the project, which may include one or more of errors 215a, alerts 215b, and structural elements 215c, for example. Structural elements 215c may be any graph element, such as a node, or a branch. In addition, the dashboard shown in FIG. 2A includes project details field 212 and editorial assignments field 213, which may be populated using respective edit actuators 214a and 214b to include vendor assignments, media content such as video, images, and the like, and EDLs, for example.

Dashboard 210B, in FIG. 2B, shows an exemplary visual interactive node-based project graph window provided by hierarchical UI 110 that allows users (e.g., users 108a-108c in FIG. 1) to explore project 211 and its dependencies via node-based project graph 221. Applied rules section 216 provides client 108b with control over what rules should be applied to node-based project graph 221. In the example of FIG. 2B, Rules "A" and "C" are selected for application, while Rule "B" is not selected for application.

Figure 2C:
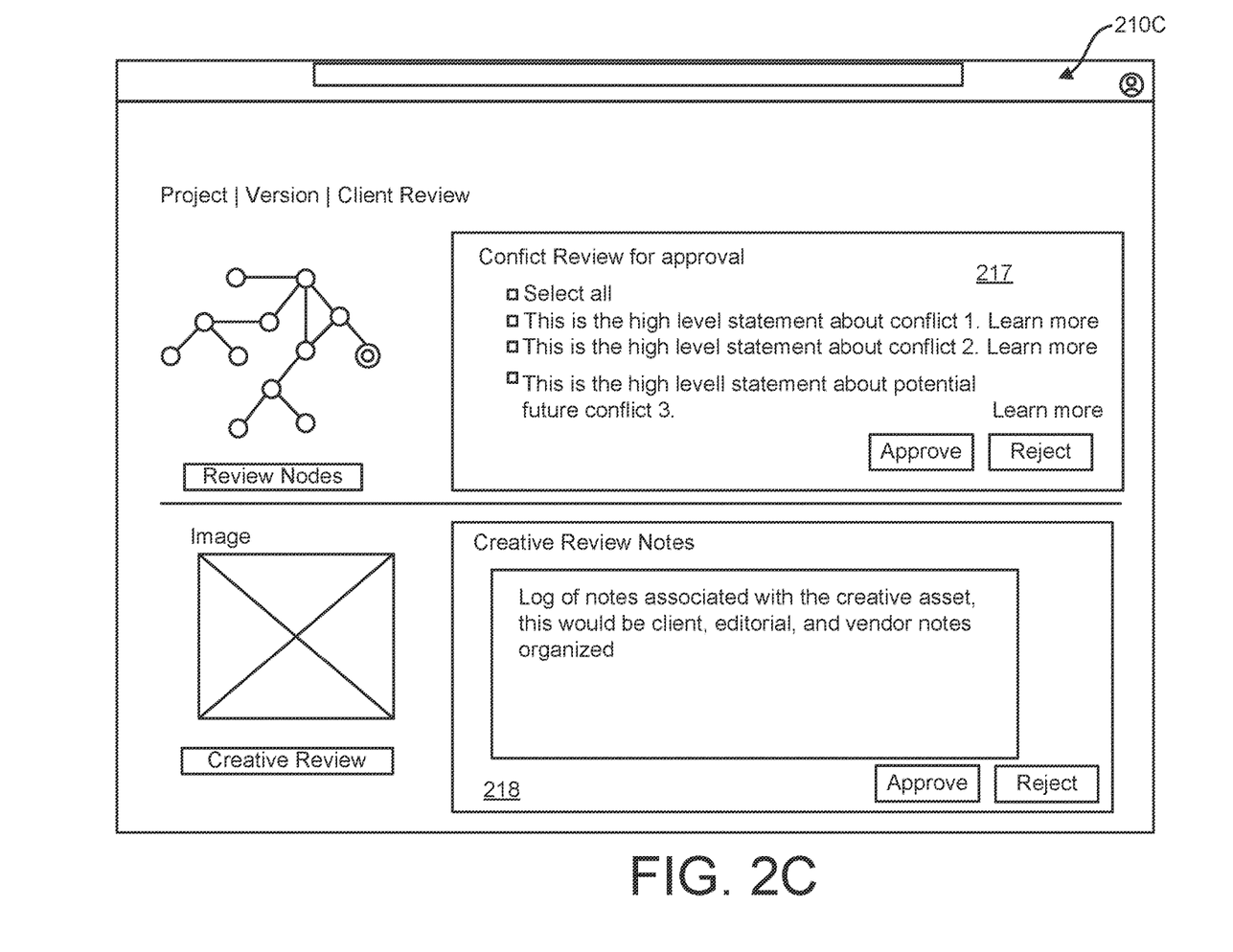
FIG. 2C shows another exemplary dashboard provided by the hierarchical UI of the node-based control and collaboration system shown in FIG. 1, according to one implementation.

FIG. 2C shows exemplary client review dashboard 210C provided by hierarchical UI 110. Client review dashboard 210C gives client 108b control of managing and accepting changes submitted by vendor 108c. Conflicts and potential future conflicts 217 are presented for review. In addition, client 108b can use client review dashboard 210C to proceed with creative review 218.

Figure 2D:
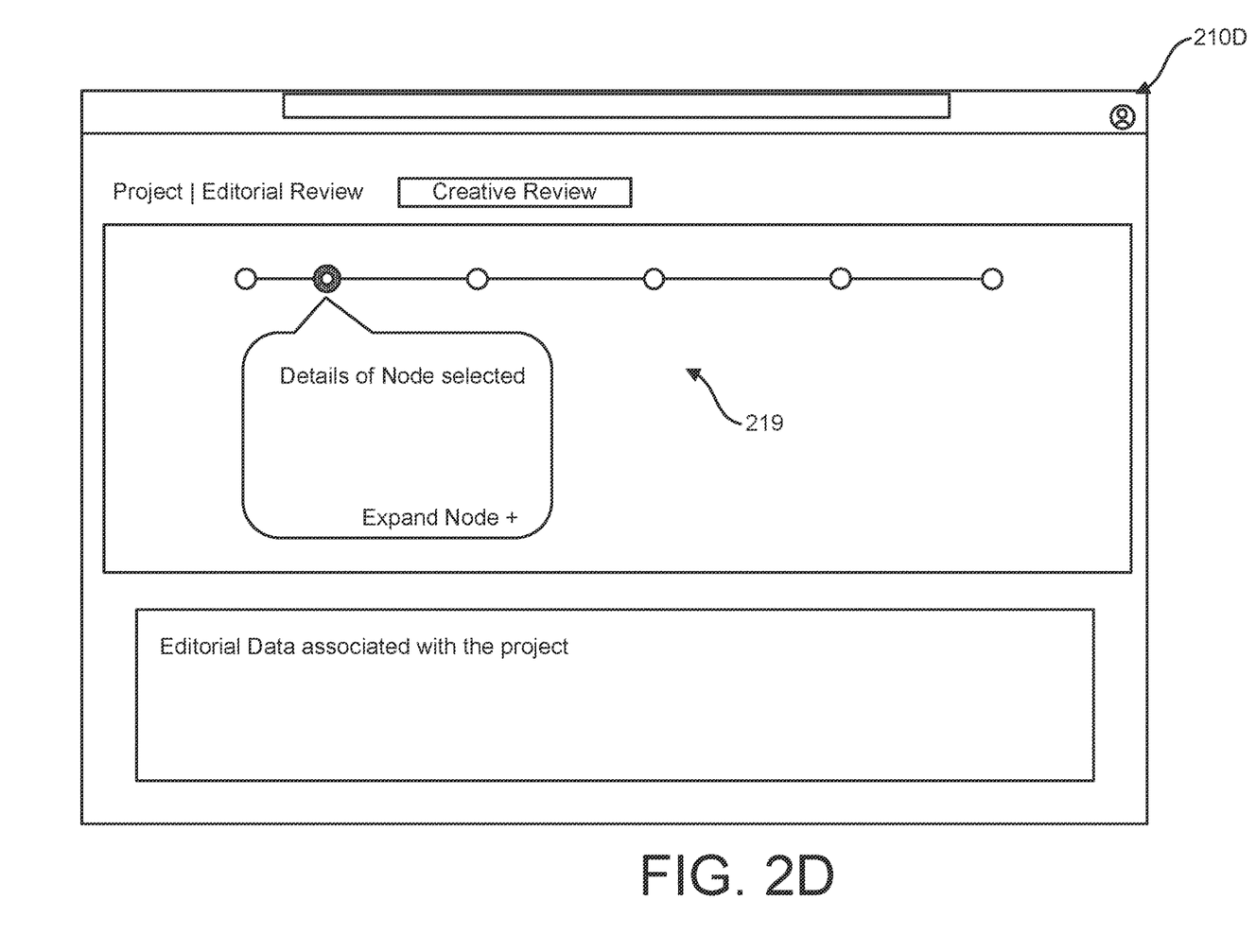
FIG. 2D shows yet another exemplary dashboard provided by the hierarchical UI of the node-based control and collaboration system shown in FIG. 1, according to one implementation.

FIG. 2D, shows exemplary editorial review dashboard 210D provided by hierarchical UI 110. As shown by FIG. 2D, editorial review dashboard 210D may be much simpler than the visual interactive node-based project graph window shown in FIG. 2B. In editorial review dashboard 210D shown in FIG. 2D, the complexity of the node-based project graph dependencies may be flattened into a single line of nodes 219 representing the latest cut. It is noted that although flattening could be included in other dashboards as well, from a practical standpoint most users of those other dashboards would not need the flattened view. Potentially, views associated with visual effects (VFX) supervisors might benefit from flattening, but this would be user-dependent.

B. Node-Based Distribution and Collaboration Subsystem 120:

Media production assets are typically organized hierarchically—sequences are composed of shots, reels are composed of sequences, full feature-length films are composed of "reels"- and the arrangement of those assets may be shifted by iterative editorial adjustments throughout the filmmaking process. As a result, a graph-based system is well suited to represent those assets and all associated dependencies when tracking changes. Regarding the term "reels," it is noted that the notion of reels is merely a custom for the industry, based on the legacy of physical film reels. Such physical film reels are not used for digital media content, but the language "reels" as applied to segments of a show such as a full feature-length film persists.

Figure 3A:
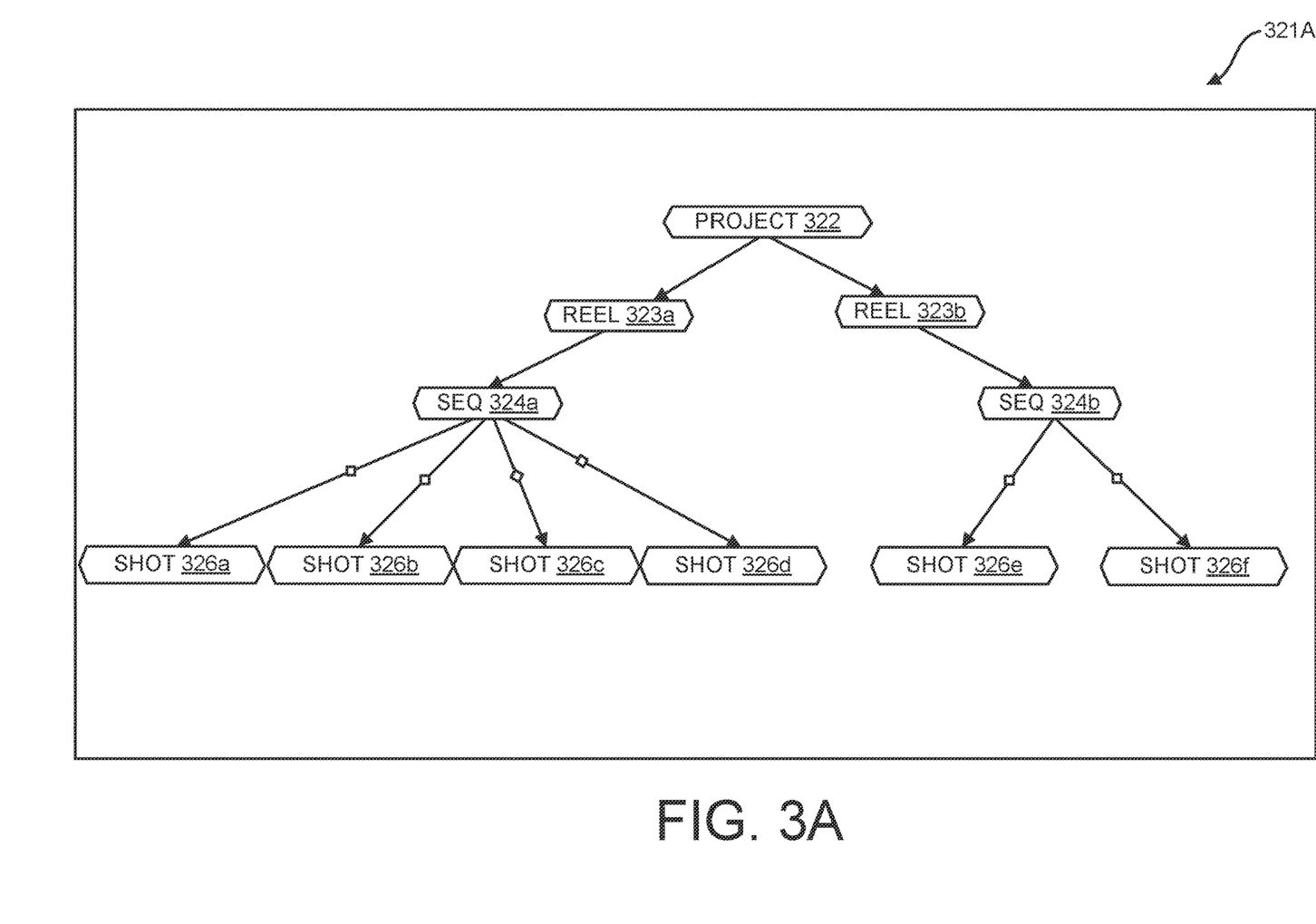
FIG. 3A shows an exemplary node-based project graph generated by the node-based control and collaboration system shown in FIG. 1, according to one implementation.
Figure 3B:
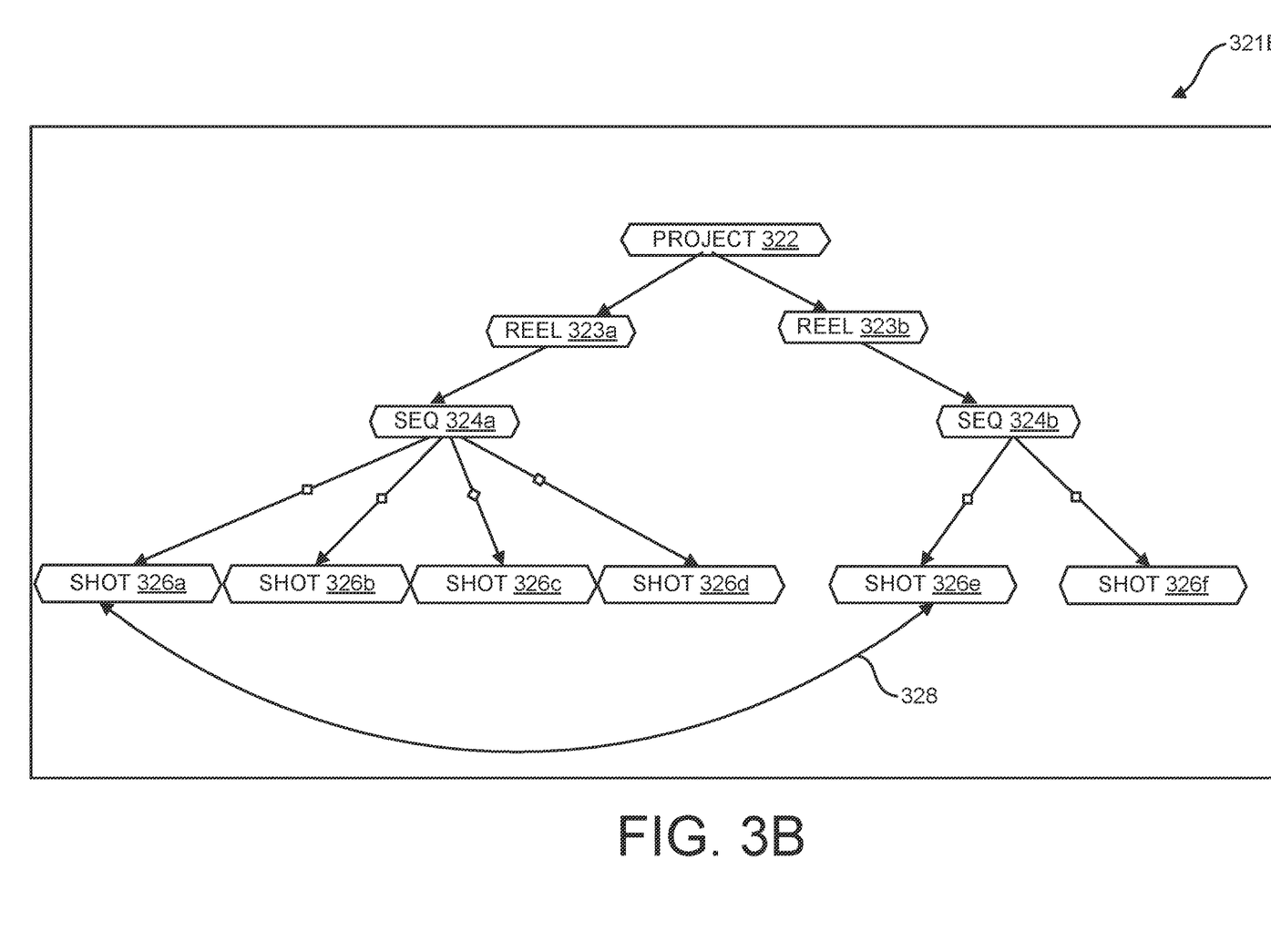
FIG. 3B shows another exemplary representation of the node-based project graph shown in FIG. 3A.

The present node-based control and collaboration solution employs a hierarchical graph representation with optional bidirectional flow capability, such that the base hierarchy includes nodes and edges to represent the hierarchical relationships among nodes. For example, referring to FIGS. 3A and 3B, FIGS. 3A and 3B show respective node-based graphs 321A and 321B of project 322 corresponding to a feature-length film, and including reels 323a and 323b and sequences 324a and 324b. It is noted that although project 322 is described as corresponding to a feature-length film in the interests of conceptual clarity, more generally a project such as project 322 may correspond to any "show." Moreover, the term "show" is standard terminology in the art and refers to the entirety of a creative presentation. Sequence 324a is shown to include shots 326a. 326b. 326c, and 326d (hereinafter "shots 326a-326d"), while sequence 324b is shown to include shots 326e and 326f. In this example, sequences 324a and 324b have a different number of shots. In other examples, sequences 324a and 324b may have the same number of shots. It is noted that, although not shown in FIGS. 3A and 3B, in other implementations, node-based graphs 321A and 321B may depict additional hierarchical levels such as "versions," as known in the art, depending from one or more of shots 326a-326d, 326e, or 326f. By way of example, shots can have multiple versions based on different takes, different internal VFX operations applied to them, different color schemes being applied, and other potential adjustments.

As shown in FIGS. 3A and 3B, shot 326a belongs to sequence 324a, which belongs to reel 323a of project 322, and so forth. In addition, there can be any number of relational edges that may be bidirectional and can connect different asset nodes to each other depending on different content or structural elements. For example, if shot 326a and shot 326e represent the same chronological scene in the story narrative, but are split up into different sequences for a non-linear story arc, relational edge 328 may be added, as shown in FIG. 3B, to represent that chronological closeness.

It is noted that although FIGS. 3A and 3B show exemplary node-based graphs 321a and 321b having a top-down hierarchy in the interests of conceptual clarity, those representations are merely provided by way of example. More generally, the node-based graphs disclosed by the present application may be multi-dimensional graphs having two, three, or more than three dimensions. In those multi-dimensional implementations, a node-based graph may include multiple orthogonal axes and may include multiple hierarchical dimensions corresponding respectively to those orthogonal axes. For example, a three-dimensional node-based graph including a vertical "z" axis, a left-right "x" axis, and an in-out "y" axis may have a z component top-down or bottom-up hierarchy, an x component left-right or right-left hierarchy, and a y component in-out or out-in hierarchy.

Automated Node-Based Graph Generator:

Node-based graphs 321A and 321B may be automatically generated from an edit decision list (i.e., an EDL). Automated graph generation can be achieved by encoder-decoder machine learning frameworks similar to those implemented in the biomedical sphere and described, for example, by Wengong Jin. Regina Barzilay, and Tommi Jaakkola in "Hierarchical Generation of Molecular Graphs using Structural Motifs," accessible at https://arxiv.org/abs/2002.03230, the contents of which are hereby incorporated fully by reference into the present application. However, automated graph generation can also be achieved by simpler means. An example workflow for producing a node-based asset graph from editorial information, making use of pre-established project hierarchy (e.g., version, shot, sequence, reel, show), and combining bottom-up and top-down techniques is described below:

Bottom-Up Graph Building:

In bottom-up graph building, an EDL parser parses the EDL file(s) into the appropriate structured information, including filenames (e.g., the filename for project 322), node identifiers (e.g., shot 326a and sequence 324a), and timing. All shots and versions are then ordered within the EDL (e.g., shot 326a comes before shot 326b according to timestamps). Each EDL is treated as a sequence-level node and its shots contained as shot-level nodes. The resulting EDL sequence nodes are then ordered according to timestamp sequencing.

Top-Down Graph Building:

As shown by FIGS. 3A and 3B, in top-down graph building, sequences are divided among reels each representing a predetermined time duration of film, such as approximately 18 minutes, for example. It is noted that this may involve splitting a sequence-level node into two parts if its full sequence timeframe spans over a reel-break. In this case, the sequence node is repeated so that a first instance of the sequence node belongs to the preceding reel node with the appropriate shot nodes also belonging to the preceding reel up to 18 minutes total, and the repeated sequence node (i.e., a second instance of the sequence node) belongs to the subsequent reel node, with its remaining shot nodes continuing the rest of the sequence. By way of example, although not shown in FIGS. 3A and 3B, assume the following: the full sequence timeframe of sequence node 324a exceeds the time duration of the reel identified by reel node 323a. In that instance, sequence node 324a may be partitioned to provide sequence node 324a-1 belonging to reel node 323a and including shot nodes 326a, 326b, and 326c, and into sequence node 324a-2 belonging to reel node 323b and including shot 326d. It is noted that in this particular instance, both shot sequence node 324a-2 including shot node 326d and sequence node 324b including shot nodes 326e and 326f would belong to reel node 323b.

As further shown by FIGS. 3A and 3B, the ordered reel nodes are joined under a single parent project node 322. (Note, for ordering and visualization purposes, sequential nodes may be displayed from left to right such that leftmost nodes correspond to being "first" in the linear sequence). The result is a complete hierarchical graph representation of the project and its assets. If there aren't given shots for certain timestamps of the proposed final timeline (that is, after building the graph from timestamp sequencing information there are gaps in the timestamps), one implementation of the system may make use of that gap information to input default placeholder nodes until a later EDL specifies the file information to go there, but another implementation may simply ignore the gaps and rely on future input EDLs to grow the graph, such that the graph starts smaller earlier in development and grows as nodes are added.

Bidirectional Relational Edges:

For certain implementations, in addition to the base hierarchical graph, additional information about connections and relationships between scenes or sequences (and therefore the assets that compose those scenes and sequences) may be added, either manually or by importing metadata with each asset. For example, if a system automatically tags each asset for location, actor, or story beat, that metadata can be imported along with the asset and EDL. Assets with the same metadata tags can receive a designed relational edge for that metadata type (e.g., a "chronology" relation might be differentiated from a "location" relation). It is noted that relational edges may be designated by any meaningful aspect shared across the media, including but not limited to location, chronology within the story, storyline, color, or music.

Once the node-based graph has been automatically generated, it may be displayed to the user for verification. Once a complete graph has been confirmed, subsequent edits will identify only those nodes to which changes have been made.

Given a set of changes to a set of nodes, node-based distribution and collaboration subsystem 120 can check all edge connections of the changed nodes to identify all other nodes that have been affected by that/those change(s), continuing onward to other more remotely connected nodes until there are no more affected nodes, and produce a list of affected nodes. The direction of information flow can be important to limit the graph search. For example, the effects of a change to a node may only flow up the graph, and not down such that a change to shot node 326a of sequence node 324a may affect sequence node 324a and its reel node 323a, but will not affect shot node 326e of sequence node 324b, where sequence node 324b is a sister node to sequence node 324a, in this instance neither up nor down but parallel to sequence node 324a. Alternatively, if changes are made to shot node 326a but settings are such that changes do not flow upward, then the changes to shot node 326a would not affect sequence node 324a or reel node 323a. If there are bidirectional relational edges connecting sister or cousin nodes, then those nodes may be affected. In some implementations, separate lists of hierarchically affected nodes and relationally affected nodes may be produced.

Alternatively, when edits entail graph structure reworking, then the node-based graph may be regenerated by the automated node-based graph generator and node-based distribution and collaboration subsystem 120 may compare the previous graph to the new graph to identify blocks of change, e.g., subgraph similarity measures such as those described by Kanigalpula Samanvi and Naveen Sivadasan in "Subgraph Similarity Search in Large Graphs," accessible at https://arxiv.org/abs/1512.05256, and by Jaya Thomas. Dongmin Seo, and Lee Sael in "Review on Graph Clustering and Subgraph Similarity Based Analysis of Neurological Disorders." accessible at https://www.ncbi.nlm.nih.gov/pmc/articles/PMC4926396/, the contents of each of which are hereby incorporated fully by reference into the present application. In this case, nodes within identified subgraphs can be checked using the approach described above in the previous paragraph to generate the list of all affected nodes.

The graphical representation of the affected nodes with the list of predicted changes can be displayed to the user for verification and conflict resolution. In some implementations, node-based distribution and collaboration subsystem 120 system can also support a graph search function so that the user can initiate a graph search to identify all points of possible conflict in the event of a change to a particular node.

Machine Learning-Based Change Identification in Visual Assets:

In addition to producing a list of affected nodes (and their files), a machine learning computer vision module may be implemented to identify what type of change occurred by analyzing the image/video directly. For example, flagging a change in a certain area of the screen, or a specific update to a highlighted character (e.g., the value for the classification of "actor" may change from version 1 of a shot to version 2 of that shot when using a facial recognition model on both versions). A number of different computer vision models could be implemented, depending on the needs of the user(s).

C. Automated Memory Space 140:

In order to enable concurrent collaboration for multiple users, there should be a component in place to enable the introduction of non-destructive changes to the shared data. In order to provide this feature, a component to manage memory storage for each collaborator is desirable. There are existing resources that can be used in cloud-based or on-premises environments capable of providing this functionality.

Temporary Storage Mechanism:

Existing cloud providers, like Amazon Web Services® (AWS®), have cloud native storage orchestrators to assist in management of this allocated storage. In addition, there is Kubernetes®, which assists in the management of storage clusters. Both of these frameworks allow users to automatically mount storage regardless of system and can conform to local or cloud providers.

In a cloud environment, an automated workflow for spinning up the necessary number of cloud instance nodes for storage, compute, or both, and spinning them back down as needed can assist in horizontal parallelization for varying compute needs. Alternatively, in an on-premises environment, standard practices may be utilized. Where a data center is present, a mechanism can be put in place to make application programming interface (API) requests to provision virtual machine storage and then attach it to a desired host. A host in this case, could be a container as the backend, and would be provisioned per collaborator making a change. Before a user would start working, a process on the host would need to format and mount it, then upon an event trigger from hierarchical UI 110, reverse the process when completion is done. This could be done in conjunction with block (fast) storage for performant results.

Non-Destructive Change Workflow:

An original copy of the sourced media may be stored on centralized storage, accessible for viewing by all collaborators, i.e., editor 108a, client 108b, and vendor 108c. The storage allocation should not affect parties involved unless they opt to merge in changes to the current working version or request to make changes, e.g., version up the data. A temporary memory space (hereinafter "temporary storage") can be created for each collaborator upon starting to do work and storage can be removed when the changes have been finalized.

By taking advantage of existing solutions, whether on-premises, cloud-based, or hybrid, the following example process may be used to create temporary storage for creative use. First, temporary storage is created for each collaborator and temporary copies of the data are allocated for each collaborator. The temporary storage is registered in a database via a unique key to reference for creation and cleanup upon request. The collaborator can then make non-destructive changes to asset copy using their assigned temporary storage. In some use cases, the collaborator can temporarily opt out of updating global shared data while making experimental changes to copied data. That is to say, the node-based graph updates continually to reflect changes made by any collaborator, except when one or more of those collaborators opts/opt out to make experimental changes.

This approach provides several advantages. For example, it enables multiple collaborators to work on an asset without having the asset locked and unlocked. In addition, it allows for easier recognition and flagging of conflicting changes by different collaborators as well as easier identification and sequencing of consistent changes by collaborators.

Figure 4:
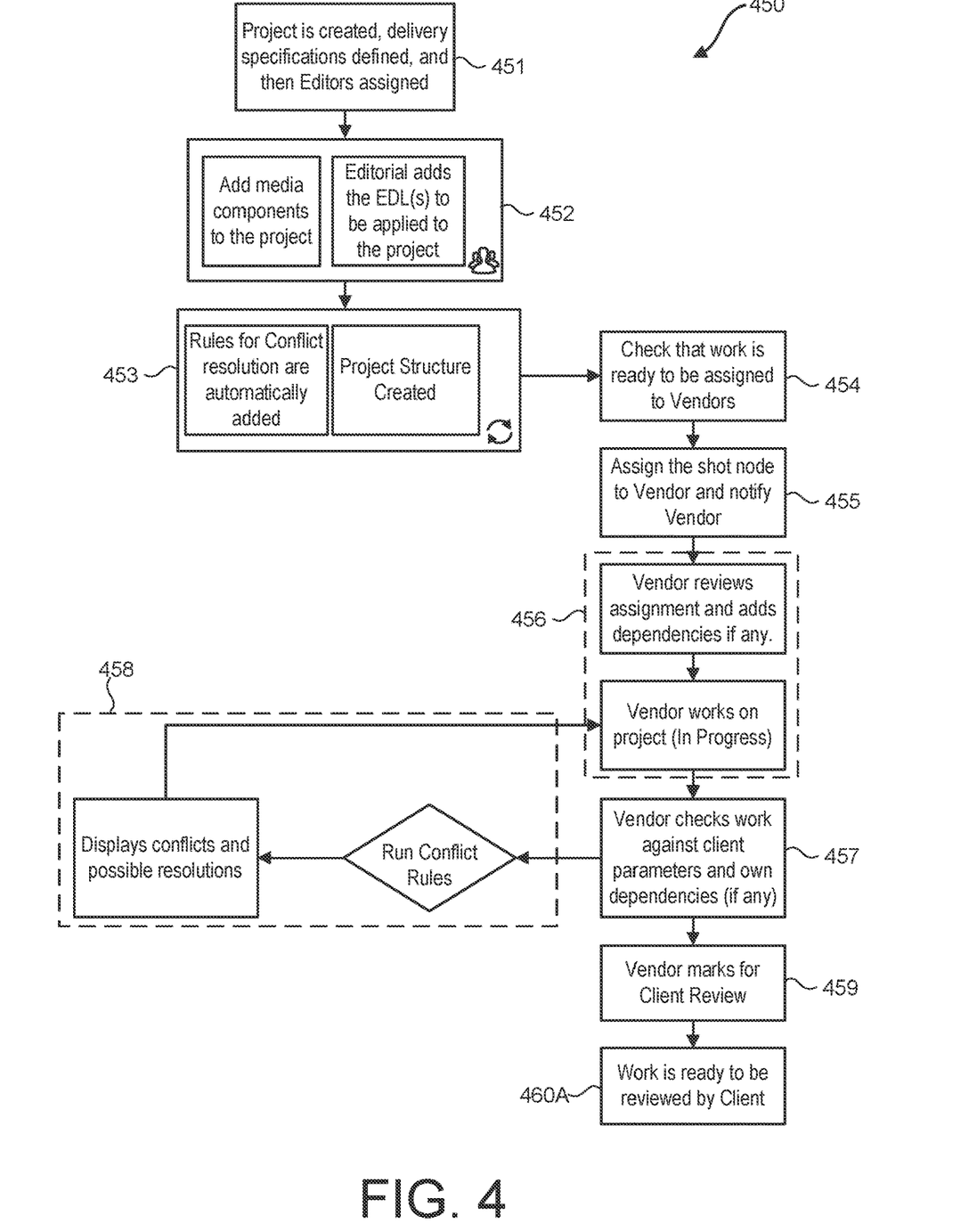
FIG. 4 shows an exemplary flow diagram outlining assignment of a project task to a system user, as well as progress and completion of the project task, according to one implementation.

Sample Workflow Utilizing Described Components:

A sample workflow using the present node-based control and collaboration system is shown in FIG. 4 and is described below. Referring to flow diagram 450 in FIG. 4, an exemplary client and vendor workflow may include the following steps. As shown in FIG. 4, the workflow begins with client 108b creating a new project, identifying delivery specifications, and assigning one or more editors 108b to the project (action 451). It is noted that as used in the present application, the feature "editor 108a" may refer to a technical specialist collaborating with client 108b, a project manager, or an outside contractor (i.e., another vendor), to name a few examples.

Client 108b then points to required data in the project, including media components, and, if available, identifiers) of previous project(s) that were similar in order to pull in the active learning model previously used in that project or projects. In addition, one or more editors 108b may provide one or more EDL(s) informing initial cuts and shots and also defining relationships between media assets (actions 452).

Automated graph creation module sets up initial graph relationships based on EDL input, and rules for conflict resolution are automatically added (actions 453). After creating a project, the node graph takes form based on the initial set of source data and settings. Client 108b now has the ability to see the current project and relationships between assets using hierarchical UI 110 to check that work is ready to be assigned to vendor 108c (action 454). As part of action 454 client 108b can hover over or click on a node to explore deeper information, drag and drop to add or correct relationships, and create and update permissions, as well as administer accounts. One or more project tasks. e.g., shot(s), corresponding respectively to nodes of the node-based graph, may be assigned to vendor 108c and vendor 108c is notified of the assignment (action 455). Assignments can include additional metadata, notes, requirements, and the like, that are stored within the assignment reference to a node. After assignment has been made to vendor 108c, there is a notification and state registered within a database to indicate that upon next logout, temporary storage will be allocated for work to commence.

Once vendor 108c has been sent project task assignments, work begins on the vendor side (actions 456). Vendor 108c receives the project task assignment through hierarchical UI 110, and an event trigger is received to create temporary storage for the work by vendor 108c. This trigger happens when vendor 108c "accepts" the work. Vendor 108c now has two options. First, if vendor 108c chooses not to use the node-based control and collaboration system to track their assignment, they may have the option to upload versions of media to be reviewed, e.g., composite, turntable, etc. They can create a description and provide notes with the media. Once the media and any associated descriptions and notes are uploaded, they are fed into the system to process changes. It is noted that the complexity of this particular workflow, i.e., client 108b using the system and vendor 108c completing work outside the system), allows the collaborative process to be standardized for every vendor. Second, if vendor 108c adopts the node-based control and collaboration system into their own environment, they may begin by converting data and using available assignment tools compatible with the format of node-based control and collaboration system 100. This could be done through node-based control and collaboration system 100 to keep track and account for all departments in a project pipeline (e.g., compositing, animation, modeling, etc., not necessarily the actual plate or reference material provided by client 108b). Each dependency and pipeline step could be represented through a node and relationship, as described above.

Whichever of the two options described above is adopted by vendor 108c, vendor 108c checks their work against parameters set by client 108b, as well as their dependencies, i.e., dependencies internal to vendor 108c (action 457), and checks for conflicts and their possible resolutions (action 458). Vendor 108c then marks the work for client review (action 459), and client 108b receives a notification in hierarchical UI 110 indicating that a change has been made by vendor 108c and that the work by vendor 108c is ready for review by client 108b (action 460A).

Figure 5:
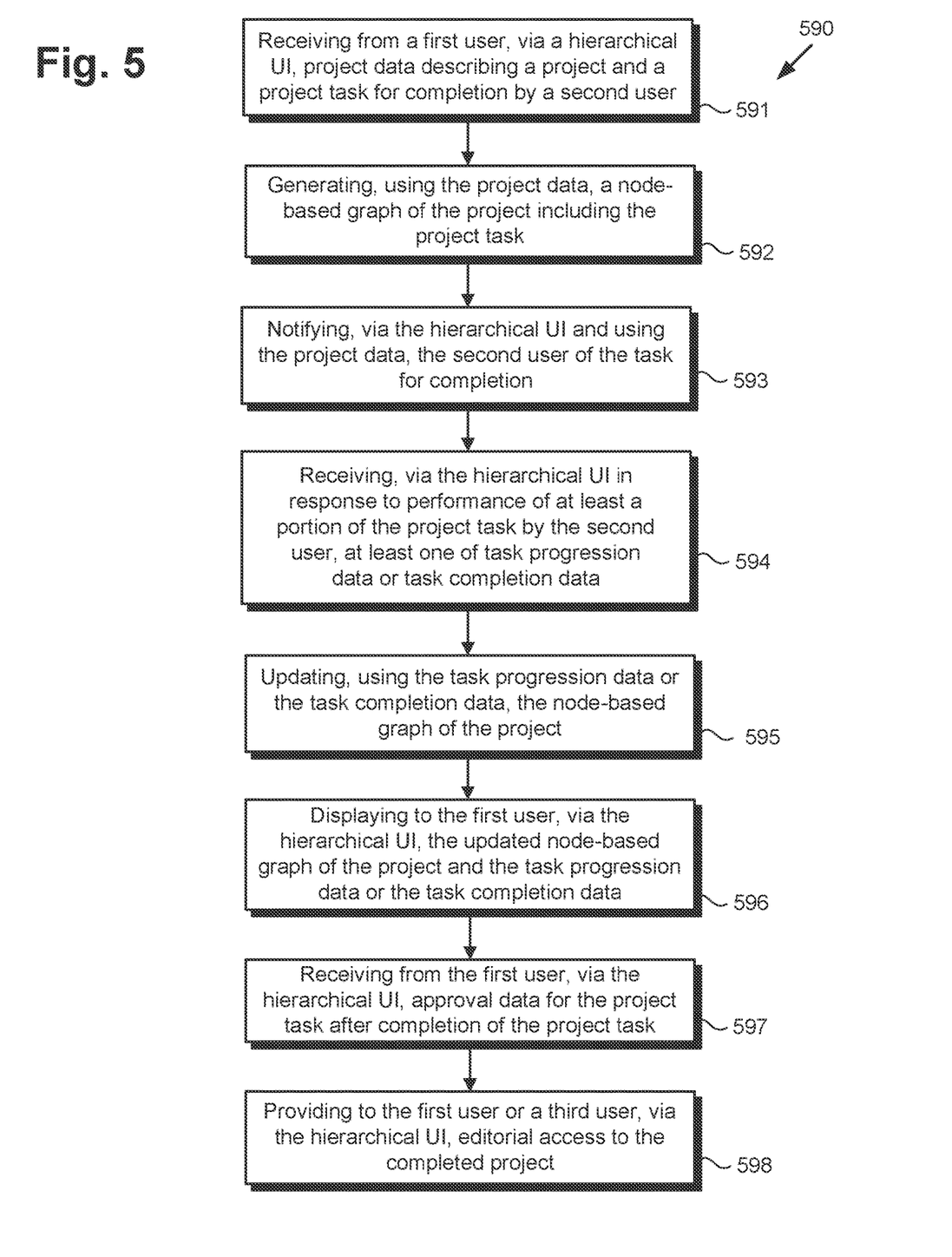
FIG. 5 shows a flowchart outlining a method for use by a node-based control and collaboration system, according to one implementation.

The functionality of node-based control and collaboration system 100, in FIG. 1, will be further described by reference to FIG. 5. FIG. 5 shows flowchart 590 outlining a method for use by node-based control and collaboration system 100, according to one implementation. It is noted that the processing hardware described by reference to flowchart 590 corresponds in general to data processor/compiler 104 and data mapper/processor 106, in FIG. 1. Thus, either or both of data processor/compiler 104 and data mapper/processor 106 may share any of the characteristics attributed to the processing hardware described by reference to flowchart 590 by the present disclosure, and vice versa.

In addition, the collaboration software code described by reference to flowchart 590 corresponds in general to the collaboration software code executed by node-based distribution and collaboration subsystem 120, as identified above. Consequently, the collaboration software code executed by node-based distribution and collaboration subsystem 120 may share any of the characteristics attributed to the collaboration software code described by reference to flowchart 590 by the present disclosure, and vice versa. Moreover, with respect to the method outlined in FIG. 5, it is noted that certain details and features have been left out of flowchart 590 in order not to obscure the discussion of the inventive features in the present application.

Referring to FIGS. 1 and 5 in combination, flowchart 590 includes receiving from a first user (the first user hereinafter referred to as "client 108*b*"), via hierarchical UI 110, project data describing a project, and a project task for completion by a second user (the second user hereinafter referred to as "vendor 108*c*") (action 591). Referring to FIG. 2A, as noted above, FIG. 2A shows project creation dashboard 210A where project details can be specified by client 108*b*. For example, the dashboard shown in FIG. 2A can be used to identify project name 211 and features 215 associated with the project, which may include errors 215*a*, alerts 215*b*, and structural elements 215*c*, for example. In addition, the dashboard shown in FIG. 2A includes project details field 212 and editorial assignments field 213, which may be populated using respective edit actuators 214*a* and 214*b* to include vendor assignments, long play source material, and EDLs, for example. The project data may be received in action 591 by the collaboration software code of node-based distribution and collaboration subsystem 120, executed by the processing hardware of node-based control and collaboration system 100.

Flowchart 590 further includes generating, using the project data received in action 591, a node-based graph of the project including the project task for completion by vendor 108*c* (action 592). Referring to FIG. 2B, dashboard 210B in that figure shows an exemplary visual interactive node-based project graph window provided by hierarchical UI 110 that allows client 108*b* in FIG. 1 to explore project 211 and its dependencies via node-based project graph 221. As noted above, FIGS. 3A and 3B also show node-based graphs, which, according to the exemplary use case depicted by node-based graphs 321A and 321B of project 322, include nodes corresponding respectively to reels 323*a* and 323*b*, sequences 324*a* and 324*b*, as well as the shots included in each sequence. As further noted above, although not shown in FIGS. 3A and 3B, in other implementations, node-based graphs 321A and 321B may depict additional hierarchical levels such as "versions," as known in the art and described above, depending from one or more of shots 326*a*-326*d*, 326*e*, and 326*f*.

Generation of the node-based graph of the project in action 592 may be performed by the collaboration software code of node-based distribution and collaboration subsystem 120, executed by the processing hardware of node-based control and collaboration system 100. That processing hardware may be configured to execute the collaboration software code to provide, via hierarchical UI 110, client 108*b* with project-level access to the node-based graph of the project. As defined for the purposes of the present application, the expression "project-level access" refers to access to a node-based graph of a project enabling client 108*b* to zoom-in and zoom-out when viewing the node-based graph. In addition, in some implementations, such project-level access may enable client 108*b* to modify any node of the node-based graph. However, in other implementations, the project-level access to the node-based graph made available to client 108*b* may provide client 108*b* with view only access to one or more task nodes of the node-based graph, which correspond respectively to the one or more assets for which a project task has been assigned to vendor 108*c*. That is to say, as used herein, the expression "task node" refers to a node of a node-based graph that represents an asset that has been assigned to vendor 108*c* for performance of a task. In some implementations, one that task has been assigned to vendor 108*c*, client 108*b* may have view only access to the task node to avoid client-side interference with vendor work-in-progress.

In some implementations, flowchart 590 may further includes notifying, via hierarchical UI 110 and using the project data received in action 591, vendor 108*c* of the project task for completion by vendor 108*c* (action 593). It is noted that action 593 is optional, and in some implementations may be omitted. For example, in some implementations, the assigned task may simply appear the next time vendor 108*c* logs in to node-based control and collaboration system 100 using hierarchical UI 110. When included in the method outlined by flowchart 590, action 593 may be performed by the collaboration software code of node-based distribution and collaboration subsystem 120, executed by the processing hardware of node-based control and collaboration system 100, as discussed above.

Vendor 108*c* may be provided, via hierarchical UI 110, with task-specific access to the node-based graph of the project. As defined for the purposes of the present application, the expression "task-specific access" refers to access to a node-based graph of a project that presents task nodes corresponding to the project task for completion by vendor 108*c* at a higher level of granularity than the project-level access provided to client 108*b*. For example, referring to FIG. 3A, the perspective of node-based graph 321A shown in FIG. 3A may correspond to project-level access to node-based graph 321A that omits some fine details, such as the specific versions depending from one or more of shots 326*a*-326*d*, 326*e*, and 326*f*. However, where a particular shot, e.g., shot 326*f*, is the project task for completion by vendor 108*c*, the task-specific access provided to vendor 108*c* may include the one or more version nodes depending from shot 326*f* that are omitted from the project-level perspective shown in FIG. 3A.

In some implementations, the task-specific access provided to vendor 108*c* may restrict access by vendor 108*c* to the one or more task nodes of the node-based graph corresponding to the project task for completion by vendor 108*c*, e.g., shot 326. However, in some implementations, the task-specific access provided to vendor 108*c* may restrict access by vendor 108*c* to the one or more task nodes of the node-based graph corresponding to the project task for completion by vendor 108*c* and downstream nodes of the one or more task nodes e.g., shot 326*f* and its dependent version or versions. Moreover, in use cases in which client 108b is a department or working group within an organization, members of other departments or working groups within the same organization may have their access to task nodes and downstream nodes of task nodes restricted.

As noted above, although exemplary node-based graph 321a is shown to have a top-down hierarchy by way of example, more generally, the node-based graphs disclosed by the present application may be multi-dimensional graphs having three or more dimensions. In those multi-dimensional implementations, as further noted above, the node-based graph may include multiple orthogonal axes and may include multiple hierarchical dimensions corresponding respectively to those orthogonal axes. In some of those implementations, the task-specific access to the node-based graph of the project provided to vendor 108c may restrict access by vendor 108c to one or more task nodes corresponding to the project task for completion by vendor 108c and nearest neighbor nodes of the one or more task nodes in any of the three or more dimensions.

Flowchart 590 further includes receiving, via hierarchical UI 110 in response to performance of at least a portion of the project task by vendor 108c, at least one of a task progression data or a task completion data (action 594). For example, in use cases in which vendor 108c works on the project task over more than one session, task progression data may be received via hierarchical UI 110 during, or at the end of, each session. Moreover, upon completion of the project task by vendor 108c, task completion data may be received via hierarchical UI 110. The task progression data, the task completion data, or both, may be received in action 591 by the collaboration software code of node-based distribution and collaboration subsystem 120, executed by the processing hardware of node-based control and collaboration system 100.

Flowchart 590 further includes updating, using the task progression data, the task completion data, or both, the node-based graph of the project generated in action 592 (action 595). In some implementations, the updates to the node-based graph may take the form of a list of changes to nodes included in the graph. For example, given a set of changes to a set of nodes, the processing hardware of node-based control and collaboration system 100 may execute the collaboration software code of node-based distribution and collaboration subsystem 120 to check all edge connections to the changed nodes to identify all other nodes that have been affected by that/those change(s), continuing onward to other more remotely connected nodes until there are no more affected nodes, and returns the complete list of affected nodes.

Alternatively, or in addition, when edits entail graph structure reworking, the processing hardware of node-based control and collaboration system 100 may execute the collaboration software code of node-based distribution and collaboration subsystem 120 to regenerate the node-based graph of the project. In some of those implementations, the processing hardware of node-based control and collaboration system 100 may further execute the collaboration software code of node-based distribution and collaboration subsystem 120 to compare the previous graph to the regenerated graph in order to identify blocks of change. In such use cases, nodes within identified blocks of change can be checked using the approach described above in the previous paragraph to generate the list of all affected nodes.

Flowchart 590 further includes displaying to client 108b, via hierarchical UI 110, the updated node-based graph of the project and the task progression data or the task completion data (action 596). Referring to FIG. 2C, FIG. 2C depicts an exemplary client review dashboard 210C provided by hierarchical UI 110. The client review dashboard shown in FIG. 2C gives client 108b control of managing and accepting changes submitted by vendor 108c. Client 108b can use client review dashboard 210C shown in FIG. 2C to proceed with creative review 218. The task progression data or the task completion data, and updated node-based graph may be displayed to client 108b, via hierarchical UI 110, by the collaboration software code of node-based distribution and collaboration subsystem 120, executed by the processing hardware of node-based control and collaboration system 100.

In some implementations, the method outlined in FIG. 5 may conclude with action 596 described above. However, in other implementations, flowchart 590 may further include receiving from the client 108b, via hierarchical UI 110, approval data for the project task after completion of the project task by vendor 108c (action 597). As depicted in FIG. 2C, client 108b may use client review dashboard 210C to approve or reject the project task completed by vendor 108c. The approval data may be received in action 597 by the collaboration software code of node-based distribution and collaboration subsystem 120, executed by the processing hardware of node-based control and collaboration system 100.

In some implementations, flowchart 590 may further include providing to one of client 108b or a third user (the third user hereinafter referred to as "editor 108a"), via hierarchical UI 110, editorial access to the project (action 598). As noted above, editor 108a may include a technical specialist collaborating with client 108b, a project manager, or an outside contractor (i.e., another vendor), to name a few examples. Referring to FIG. 2D. FIG. 2D shows exemplary editorial review dashboard 210D provided by hierarchical UI 110, in FIG. 1. As depicted by FIG. 2D, editorial review dashboard 210D may be much simpler than the visual interactive node-based project graph window shown in FIG. 2B. In editorial review dashboard 210D shown in FIG. 2D, the complexity of the node-based project graph dependencies may be advantageously be flattened into single line of nodes 219 representing the latest cut.

Thus, the present application discloses node-based control and collaboration systems and methods that advance the state-of-the-art at least by eliminating or significantly decreasing duplication of data among clients and vendors, centralizing data storage, thereby reducing file transfer time and effort, reducing workflow maintenance on the vendor and client sides, thereby reducing development time and cost, and reducing project turnaround time. In addition, the node-based control and collaboration systems and methods disclosed in the present application can advantageously notify clients and vendors of changes to their assignments or file "unlocked" status for making changes to a creative asset automatically, as well as provide a version control/hash system to reduce archival storage needs and facilitating roll-back to previous version of a creative asset.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a processing hardware, and a system memory storing an automated node-based graph generator and a collaboration software code including a hierarchical user interface (UI);
the processing hardware configured to execute the collaboration software code to:
receive from a first user, via the hierarchical UI, project data describing a project, and a project task for completion by a second user;
generate, using the automated node-based graph generator and the project data, a node-based graph of the project including the project task, the automated node-based graph generator comprising at least one of a machine learning model or an edit decision list (EDL) parser;
receive, via the hierarchical UI in response to performance of at least one portion of the project task by the second user, at least one of a task progression data or a task completion data;
update, using the at least one of the task progression data or the task completion data, the node-based graph of the project;
display to the first user, via the hierarchical UI, the updated node-based graph of the project and the at least one of the task progression data or the task completion data
provide, via the hierarchical UI, the first user with project-level access to the node-based graph of the project; and
provide, via the hierarchical UI, the second user with task-specific access to the node-based graph of the project, wherein the task-specific access to the node-based graph presents one or more task nodes corresponding to the project task for completion by the second user at a higher level of granularity than the project-level access provided to the first user;
wherein the task-specific access to the node-based graph restricts access by the second user to the one or more task nodes corresponding to the project task for completion by the second user.

2. The system of claim 1, wherein providing the first user with project-level access to the node-based graph of the project enables the first user to zoom-in and zoom-out when viewing the node-based graph.

3. The system of claim 1, wherein the project-level access enables the first user to modify any node of the node-based graph.

4. The system of claim 1, wherein the project-level access provides the first user with view only access to one or more task nodes of the node-based graph corresponding to the project task for completion by the second user.

5. The system of claim 1, wherein the processing hardware is further configured to execute the collaboration software code to display to the first user, via the hierarchical UI, a conflict or a potential future conflict resulting from the performance of the at least one portion of the project task by the second user.

6. The system of claim 1, wherein the task-specific access restricts access by the second user to downstream nodes of the one or more task nodes.

7. The system of claim 1, wherein the processing hardware is further configured to execute the collaboration software code to:
receive from the first user, via the hierarchical UI, an approval data for the project task after completion of the project task by the second user; and
provide to one of the first user or a third user, via the hierarchical UI, editorial access to the project task.

8. The system of claim 1, wherein the node-based graph comprises a multi-dimensional graph having two or more dimensions.

9. The system of claim 8, wherein the task-specific access restricts access by the second user to nearest neighbor nodes of the one or more task nodes in any of the two or more dimensions.

10. A method for use by a system including a processing hardware, and a system memory storing an automated node-based graph generator and a collaboration software code including a hierarchical user interface (UI), the method comprising:
receiving from a first user, by the collaboration software code executed by the processing hardware and via the hierarchical UI, project data describing a project, and a project task for completion by a second user;
generating, by the collaboration software code executed by the processing hardware and using the automated node-based graph generator and the project data, a node-based graph of the project including the project task, the automated node-based graph generator comprising at least one of a machine learning model or an edit decision list (EDL) parser;
receiving, by the collaboration software code executed by the processing hardware and via the hierarchical UI in response to performance of at least one portion of the project task by the second user, at least one of a task progression data or a task completion data;
updating, by the collaboration software code executed by the processing hardware and using the at least one of the task progression data or the task completion data, the node-based graph of the project;
displaying to the first user, by the collaboration software code executed by the processing hardware and via the hierarchical UI, the updated node-based graph of the project and the at least one of the task progression data or the task completion data;
providing, by the collaboration software code executed by the processing hardware and via the hierarchical UI, the first user with project-level access to the node-based graph of the project; and
providing, by the collaboration software code executed by the processing hardware and via the hierarchical UI, the second user with task-specific access to the node-based graph of the project, wherein the task-specific access to the node-based graph presents one or more task nodes corresponding to the project task for completion by the second user at a higher level of granularity than the project-level access provided to the first user;
wherein the task-specific access to the node-based graph restricts access by the second user to the one or more task nodes corresponding to the project task for completion by the second user.

11. The method of claim 10, wherein providing the first user with project-level access to the node-based graph of the project enables the first user to zoom-in and zoom-out when viewing the node-based graph.

12. The method of claim 11, wherein the project-level access enables the first user to modify any node of the node-based graph.

13. The method of claim 11, wherein the project-level access provides the first user with view only access to one or more task nodes of the node-based graph corresponding to the project task for completion by the second user.

14. The method of claim 11, further comprising:
displaying to the first user, by the collaboration software code executed by the processing hardware and via the hierarchical UI, a conflict or a potential future conflict resulting from the performance of the at least one portion of the project task by the second user.

15. The method of claim 10, wherein the task-specific access restricts access by the second user to downstream nodes of the one or more task nodes.

16. The method of claim 10, further comprising:
receiving from the first user, by the collaboration software code executed by the processing hardware and via the hierarchical UI, an approval data for the project task after completion of the project task by the second user; and providing to one of the first user or a third user, by the collaboration software code executed by the processing hardware and via the hierarchical UI, editorial access to the project task.

17. The method of claim 10, wherein the node-based graph comprises a multi-dimensional graph having two or more dimensions.

18. The method of claim 10, wherein the task-specific access restricts access by the second user to nearest neighbor nodes of the one or more task nodes in any of the two or more dimensions.

* * * * *